June 2, 1964  R. G. MARR  3,135,131
PUSH-PULL CABLE CONSTRUCTION
Filed April 11, 1960
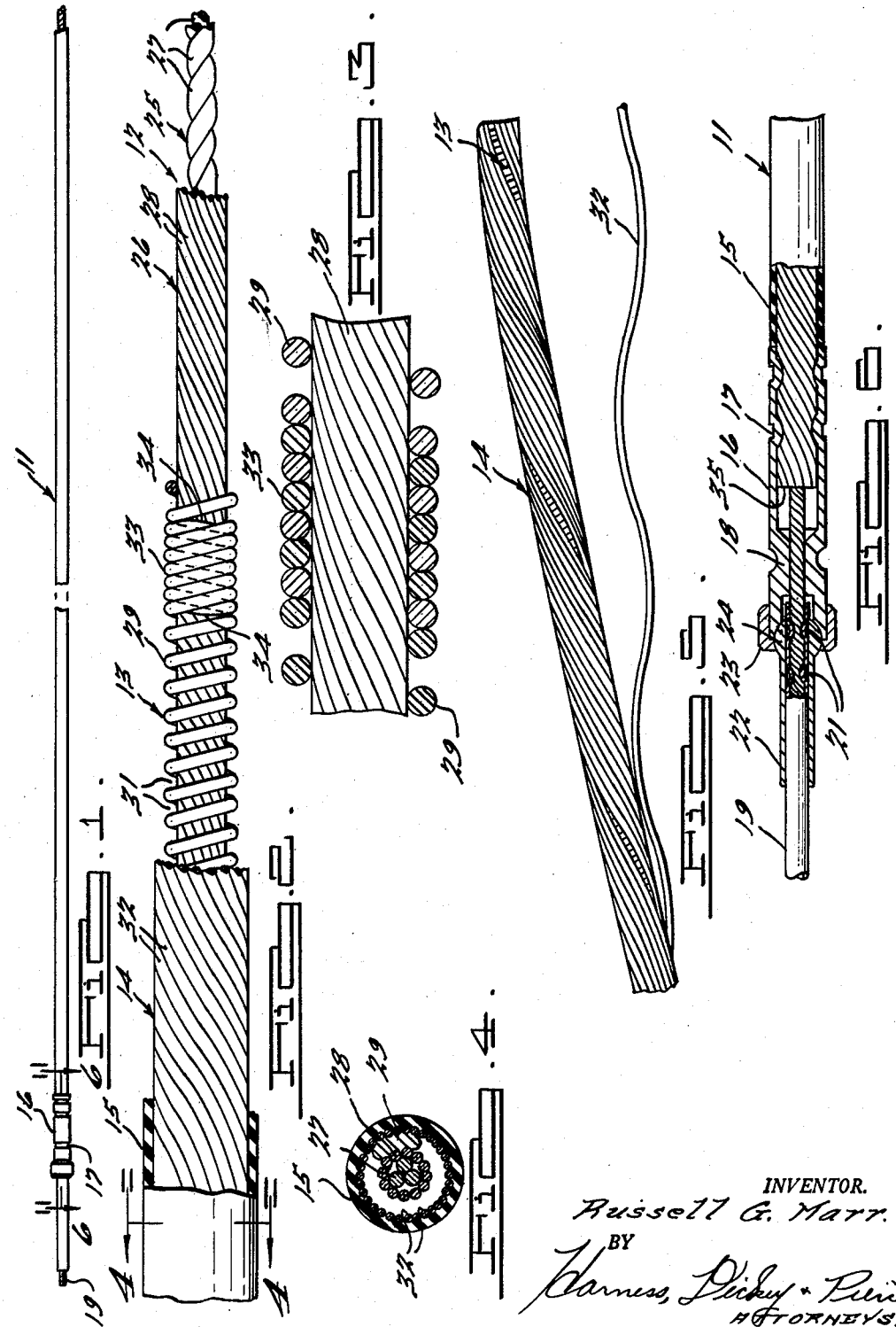
INVENTOR.
Russell G. Marr.
BY
Harness, Dickey & Pierce.
ATTORNEYS.

United States Patent Office 3,135,131
Patented June 2, 1964

3,135,131
PUSH-PULL CABLE CONSTRUCTION
Russell G. Marr, Detroit, Mich., assignor to Marmac Products Inc., Detroit, Mich., a corporation of Ohio
Filed Apr. 11, 1960, Ser. No. 21,421
9 Claims. (Cl. 74—501)

This invention relates to push-pull cable constructions, and more particularly to cables used to transmit reciprocating motions to locations remote from the operator, such as to an outboard engine or an automotive transmission.

It is an object of the invention to provide a novel and improved push-pull cable construction which is capable of being installed in confined quarters which require sharp bends in the cable, without the danger of altering the relative lengths of the inner core and outer conduit or the intermediate support coil, thus permitting the cable to be cut to accurate dimensions and the controls to operate in the intended manner without lost motion and within the prescribed limits of movement.

It is another object to provide an improved push-pull cable construction of this character which facilitates the joining of lengths of the intermediate support coil, this coil, unlike the inner core or outer conduit, being conveniently producible only in limited lengths. In this connection, it is an object to provide an improved support coil construction for push-pull cables in which the adjacent supporting coil lengths may be joined without the necessity of welding, brazing or similar operations.

It is also an object to provide an improved push-pull cable of this character is which an abundant lubricant supply can be retained, reducing the possibility of binding or freezing of the cable.

It is a further object to provide an improved push-pull cable having the above characteristics, in which the outer conduit strands will not have a tendency to unravel when a cable length is cut, but will retain their relative positions.

It is another object to provide a push-pull cable of this nature having a novel and improved construction for the core, enhancing its compressive as well as tensile characteristics.

It is also an object to provide an improved cable construction of the above character in which the retaining means for the outer conduit also serves as a protective sheath which further aids in lubricant retention.

Other objects, features, and advantages of the present invention will become apparent from the subsequent description, take in conjunction with the accompanying drawings.

In the drawings:

FIGURE 1 is an elevational view of the novel flexible cable of this invention and a terminal connector;

FIGURE 2 is an enlarged elevational view, partly sectioned, of a portion of the cable showing its various components;

FIGURE 3 is a cross-sectional view of a juncture of two lengths of the intermediate supporting coil;

FIGURE 4 is a cross-sectional view taken along the line 4—4 of FIGURE 2, and showing the interfitting of the cable components;

FIGURE 5 is a perspective view of a portion of the cable showing a strand of the outer conduit separated from the remainder of the conduit strands; and FIGURE 6 is a cross-sectional view of a terminal connector attached to one end of the cable.

In general terms, the illustrated embodiment of the improved push-pull cable of this invention comprises a core having an inner compressive section and an outer tensile section, an intermediate supporting coil surrounding said core, an outer stranded conduit, and a sheath surrounding said conduit. The inner core section comprises a plurality of relatively thick wires of spring tempered steel, and the outer core section a reverse lay of relatively thin strands of steel wire. The supporting coil comprises a helical spring wire of relatively short pitch, the pitch of the coil being chosen as substantially twice the wire diameter. The outer conduit comprises strands of wire having a long pitch, each strand being preformed to its final shape, so that the assembled conduit strands will not spring apart when cut. An outer sheath or covering of extruded vinyl or similar material encloses the outer conduit.

Referring more particularly to the drawings, the novel flexible cable is generally indicated at 11 and comprises a core generally indicated at 12, an intermediate supporting coil generally indicated at 13, an outer conduit generally indicated at 14, and an outer sheath 15. The cable is adapted to be connected to relatively reciprocable elements in a conventional manner, so that core 12 may be subjected to either compression or tension. Such a connection is shown in FIGURE 6 and comprises a stationary sleeve 16 crimped at 17 to one end of conduit 14 and having a bearing portion 18 through which core 12 passes. A tubular control rod 19 is crimped at 21 to the end of core 12, and is slidably supported by a sleeve 22, this sleeve being held to the outer end of sleeve 16 by a collar 23 engageable with a spherical enlargement 24 at the end of sleeve 22.

In the installation of a flexible cable, it is extremely important in many instances to insure that the movement of rod 19 relative to sleeve 16 be held between close tolerances. Since the required length of cable must be precut before installation, the necessity of providing sharp bends in the cable as it is installed has often resulted in improper functioning of the control due to changes in the relative lengths of the core and conduit. Such apparent lengthening of the conduit relative to the core which it encloses has been found to be due to changes in the effective length of the intermediate supporting means or of the conduit due to its becoming out-of-round.

This problem is obviated by flexible cable 11 constructed according to the principles of this invention. Core 12 comprises an inner compression core section generally indicated at 25 and a tensile core section generally indicated at 26. Compression core section 25 comprises three wires 27 of spring tempered or hardened high-carbon steel, laid helically in one direction. Tension core section 26 comprises a plurality of wires 28 of ordinary composition laid helically in a direction opposite to that of section 25. The wires in both sections 25 and 26 are in close juxtaposition, the wire diameter in section 25 being substantially greater than that in section 26, with the number of wires in section 26 being greater than that in section 25.

Intermediate supporting coil 13 comprises one or a plurality of lengths of helically wound wires 29, these wires having a lay opposite to that of section 26. Wire 29 may be fabricated of spring steel and is shown as having a diameter somewhat larger than that of wire 28. The pitch of the convolutions of wire 29 is substantially less than those of wires 27 or 28, and is in fact substantially twice the diameter of wire 29. In other words, the space between convolutions, indicated at 31 in FIGURE 2, is substantially equal to the thickness of the convolutions of wire 29. Wire 29 is wound so that tensile core section 26 will be in sliding contact therewith.

Outer conduit 14 comprises a plurality of wires 32 laid helically in a direction reverse from that of supporting coil 13 and having a substantially longer pitch.

Wires 32 are in close juxtaposition, and are in tight engagement with coil 13. According to the invention, wires 32 are fabricated by shaping the wires in a drawing die or otherwise to the configuration which they will finally assume when in wound position. FIGURE 5 illustrates this by means of a strand 32 separated from the other wires.

Outer sheath 15 is preferably fabricated of an impervious flexible electrically non-conductive material, such as extruded vinyl or a similar plastic material. This sheath is in tight engagement with conduit 14 and when the cable is installed, will extend up to terminal sleeve 16 as seen in FIGURE 6.

Several advantages of the novel flexible cable will become obvious from a discussion of its installation and operation. When installing a length of cable 11 between a control point and an apparatus to be controlled, it will often be necessary to use a longer length than that of each section of supporting coil 13. As mentioned previously, this supporting coil can only be conveniently manufactured up to a predetermined maximum length, since the manufacture of longer lengths will cause the spring steel wire to curl up in an unwieldly manner. According to the invention, a plurality of lengths of section 13 may be joined without the necessity of welding or otherwise securing them in an inconvenient manner. As shown in FIGURE 2, a juncture 33 of two sections 13 may be effected by threading the convolutions into each other for a number of turns. This is because the space between convolutions is substantially equal to the wire diameter. To facilitate this threading, the ends of wires 29 may be tapered as indicated at 34 in FIGURE 2. FIGURE 3 indicates the manner in which the convolutions of a juncture 33 will be interengaged in a secure manner.

When installing the cable, it will of course be necessary to cut the ends of core 12, conduit 14 and sheath 15 to their proper lengths. As end 35 of conduit 14 is cut, as shown in FIGURE 6, there will be no tendency for the strands of this conduit to separate, because of the preforming of the shape of these strands as illustrated in FIGURE 5.

In installing the novel cable 11, it will sometimes be necessary to bend the cable sharply because of space limitations. When this occurs, the portions of wire 29 on the inner radius of the bend will approach each other, while the portions on the outer radius will become separated. Because of the spacing between the convolutions of wire 29 described above, the inner convolution portions will not engage each other, and the length of coil 13 along its axis will therefore remain constant. Because coil 13 is in supporting relation with the strands of conduit 14, this conduit will be unable to assume an elliptical or out-of-round cross-sectional shape as it is bent. This will prevent "birdcaging" or radially outward movement of portions of strands 32, and will also prevent any change in the length of conduit 14 along the cable axis. Thus, the relative length of core 12 and conduit 14 will remain constant, preserving close tolerances in the cutting of these components.

The spacing between the convolutions of wire 29 will also permit the retention of a substantial amount of grease or other lubricant which may be necessary for proper operation of cable 11. In this connection, sheath 15 will serve to prevent any loss of such lubricant from the cable.

In operation of cable 11, compressive force exerted on core 12 by rod 19 will be assumed primarily by compression core section 25. The hardened quality and relatively large diameter of the wires 27 in core section 25 will facilitate the transmittal of relatively large compressive forces by core 12 without any tendency to distort wires 28 of core section 26. Upon tensile force being exerted on core 12, wires 28 of tensile core section 26 will serve primarily to transmit such force.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a flexible cable, a core, a conduit surrounding said core, and a supporting coil interposed between said conduit and core, said supporting coil comprising a series of connected lengths, each formed of a single wire strand having a convolution pitch equal to substantially twice the wire diameter, each length being connected with an adjacent length by several interengaging convolutions on adjacent ends of said lengths.

2. In a flexible cable, a core comprising a compression core section and a tensile core section surrounding said compression core section, said compression core section comprising a plurality of hardened steel round wires of relatively large diameter engaging each other at a central axis, said tensile core section comprising a plurality of steel round wires of ordinary carbon content laid in the opposite direction from the wires of said compression core section, a conduit surrounding said core, and a supporting coil disposed between said conduit and core and in sliding engagement with said core.

3. The combination according to claim 2, said supporting coil comprising a single strand of wire laid in a direction opposite to that of the tensile core wires, the convolution pitch of said supporting coil wire being substantially twice its diameter.

4. In a flexible cable, a core comprising a compression core section and a tensile core section surrounding the compression core section, said compression core section comprising a relatively small number of large diameter round wires laid in one direction engaging each other at the central axis, said tensile core section comprising a relatively large number of small diameter round wires laid in the other direction, a conduit surrounding said core, and a supporting coil disposed within said conduit and surrounding said core in slidable engagement therewith.

5. The combination according to claim 4, said conduit comprising a plurality of juxtaposed wires laid in the same direction as said tensile core section, said supporting coil comprising a single strand of wire wound in a direction opposite to the lay of said tensile core section and said conduit.

6. The combination according to claim 5, each strand of said conduit having an unstressed shape substantially the same as its shape when in position forming part of said conduit.

7. The combination according to claim 5, further provided with an outer sheath of impervious flexible electrically non-conductive material surrounding said conduit.

8. In a flexible cable, a core comprising an inner compression core section of a plurality of wires laid in one direction with a relatively long pitch, an outer tensile core section comprising a plurality of wires laid in the opposite direction with a relatively long pitch, a conduit comprising a plurality of juxtaposed wires laid in the same direction as said tensile core section with a relatively long pitch, and a supporting coil tightly engageable with the inside of said conduit and slidably engageable with the outside of said tensile core section, said supporting coil comprising a series of connected lengths; each formed of a helically wound wire of predetermined diameter and relatively short pitch, said wire being wound in a direction opposite to the lay of said tensile core and said conduit and having a convolution pitch substantially equal to twice said predetermined wire diameter, each length being connected with an adjacent length by several interengaging convolutions on adjacent ends of said lengths.

9. The combination according to claim 8, further provided with an outer sheath of impervious flexible electrically non-conductive material tightly surrounding said outer conduit.

References Cited in the file of this patent

UNITED STATES PATENTS

| | | |
|---|---|---|
| 906,113 | Curtis | Dec. 8, 1908 |
| 1,896,285 | Burd | Feb. 9, 1933 |
| 1,939,766 | Corset | Dec. 19, 1933 |
| 1,951,723 | Burd et al. | Mar. 30, 1934 |
| 1,953,915 | Burgett et al. | Apr. 3, 1934 |
| 2,045,568 | Burd | June 30, 1936 |
| 2,083,715 | Kesling | June 15, 1937 |
| 2,211,790 | Pile | Aug. 20, 1940 |
| 2,438,053 | Hettinga | Mar. 16, 1948 |
| 2,535,634 | Hubbard | Dec. 26, 1950 |
| 2,706,494 | Morse | Apr. 19, 1955 |
| 3,063,303 | Cadwallader | Nov. 13, 1962 |

FOREIGN PATENTS

| | | |
|---|---|---|
| 28,115 | Great Britain | Aug. 17, 1911 |
| 437,194 | Great Britain | Oct. 21, 1935 |
| 442,138 | Great Britain | Jan. 30, 1936 |
| 494,460 | Great Britain | Oct. 26, 1938 |
| 634,953 | Great Britain | Mar. 29, 1950 |
| 122,138 | Switzerland | Nov. 16, 1927 |
| 472,094 | Canada | Mar. 13, 1951 |
| 1,224,692 | France | Feb. 8, 1960 |